Jan. 1, 1935.  A. A. MAILLET  1,986,065
OPTICAL SYSTEM HAVING MULTIPLE FOCI AND A SINGLE SOURCE OF LIGHT
Filed Nov. 30, 1932  2 Sheets-Sheet 1
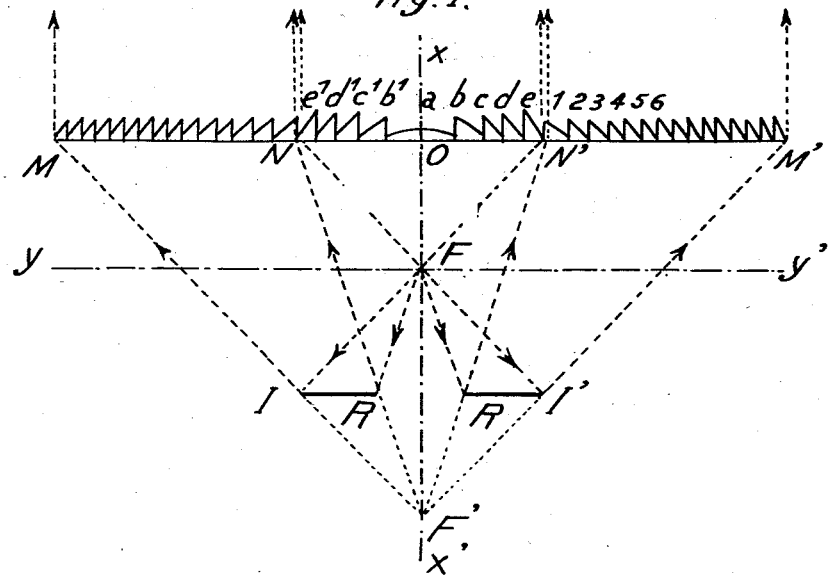
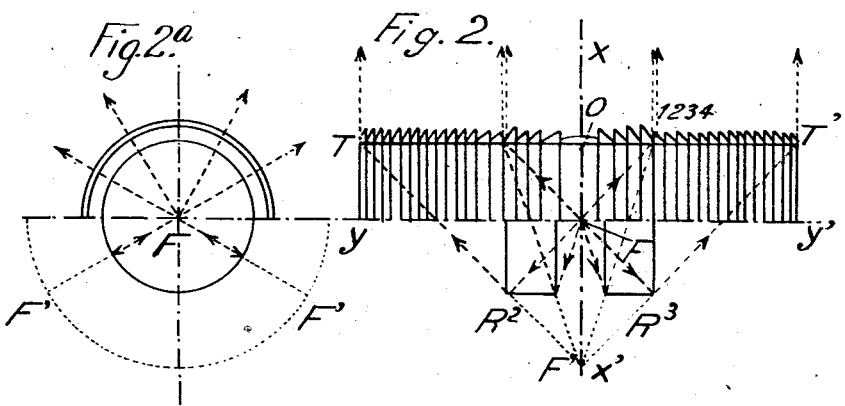
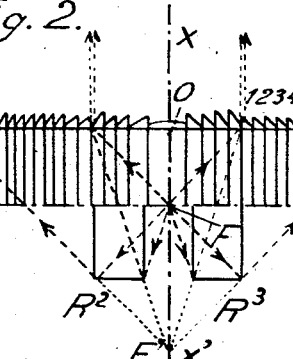
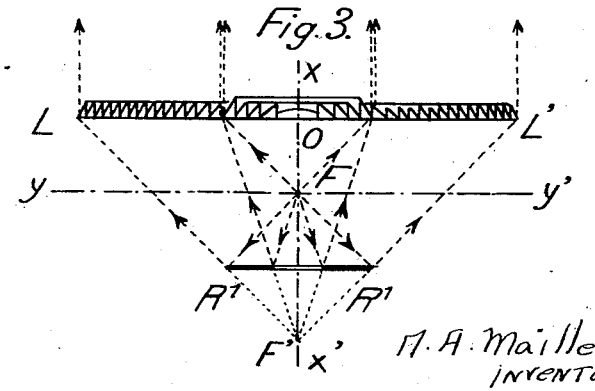
M. A. Maillet
INVENTOR Jan. 1, 1935.  A. A. MAILLET  1,986,065
OPTICAL SYSTEM HAVING MULTIPLE FOCI AND A SINGLE SOURCE OF LIGHT
Filed Nov. 30, 1932  2 Sheets-Sheet 2

Patented Jan. 1, 1935

1,986,065

UNITED STATES PATENT OFFICE 1,986,065

OPTICAL SYSTEM HAVING MULTIPLE FOCI AND A SINGLE SOURCE OF LIGHT

Antoine André Maillet, Paris, France

Application November 30, 1932, Serial No. 645,107
In France December 2, 1931

13 Claims. (Cl. 240—106)

In actual light projecting apparatus for lighthouses and, generally speaking, in optical systems comprising dioptric drums or dioptric lenses with catadioptric elements, the dioptric rings embrace, relatively to the source of light, a vertical angle from 60 to 90° at the maximum for fixed lights and a cone from 60 to 90° of maximum opening for flash lights. The remainder of the flux emitted by the source of light is collected by the catadioptric rings having over dioptric rings the following inconveniences: they are much heavier, of low efficiency, of materially higher cost price, they necessitate a careful adjustment and complicated and costly armatures, and they receive the light rays from the source seen under an unfavourable angle.

Finally, as these rings are necessarily re-entering rings, the apparent surface of any optical panel which does not embrace a horizontal angle approximating 180° narrows in proportion as the focal plane is farther away.

The present invention is adapted to avoid these serious inconveniences and, for that purpose, it has for its main object the combination with the ordinary Fresnel dioptric surfaces directly lighted by a source of light, of supplementary dioptric surfaces receiving, after reflection on suitably arranged reflectors, a portion of the luminous flux emitted by the source, the entire structure constituting an optical system having several foci but illuminated by a single source of light.

The invention also includes in its scope the following points, taken separately or according to any combinations:

(a) The reflecting surfaces can be constituted by mirrors, total reflection prisms, etc.

(b) Their sections can be formed by stepped arcs of ellipses and such that the rays emitted by the single source of light are reflected on a number of juxtaposed series of supplementary dioptric surfaces.

(c) By the rotation of the theoretical optical system about the two orthogonal axes passing through the single source of light, an optical system provided with lenses and with dioptric drums is respectively obtained, the reflecting surfaces of which are respectively annular reflectors and cylindrical reflectors.

Other features of the invention will appear from the following description given hereinafter with reference to the accompanying drawings, in which:

Fig. 1 is a simple example of an optical system having two foci according to the invention.

Fig. 2 shows the application of this system to an apparatus comprising dioptric drums and, Fig. 2a is a farther diagrammatical view of the arrangement shown in Fig. 2.

Fig. 3 shows the said system applied to an apparatus provided with lenses.

Figure 4:
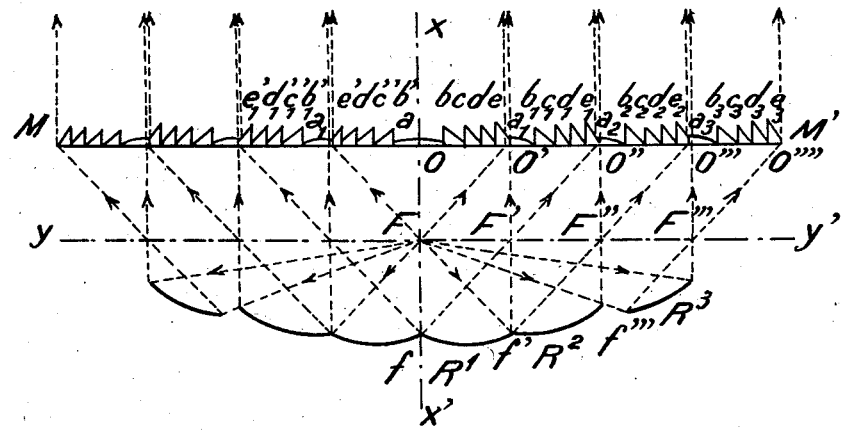
Fig. 4 illustrates a modification having a greater number of foci.
Figure 5:
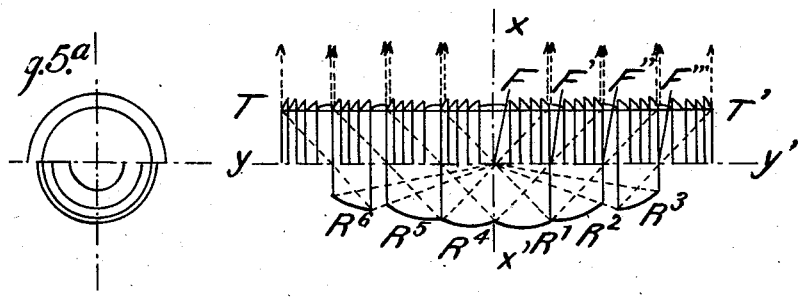
Figure 6:
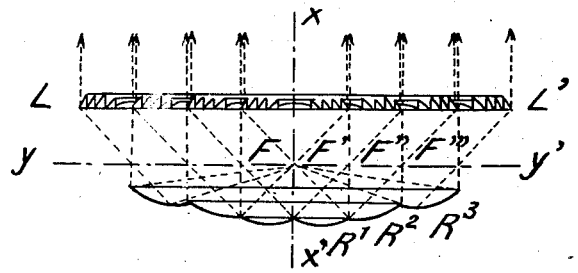

Figs. 5 and 6 respectively illustrate the application of the invention to two apparatus having Fresnel dioptric drums and lenses, made according to the example of Fig. 4.

Fig. 5a is a diagrammatical view of the arrangement shown in Fig. 5.

According to the invention, to the known Fresnel dioptric rings (the straight sections of which are shown at $a, b, c, d, e, b', c', d', e'$ in Fig. 1 and the common focus of which is at F where the single source of light is placed) are juxtaposed supplementary dioptric rings, the straight sections of which are shown at 1, 2, 3, 4, 5, 6, etc. and the common focus of which is at F'. At RR are shown reflector sections on which are reflected the light rays issued from F. The latter, after reflection on RR, strike the incident faces of the supplementary dioptric rings 1, 2, 3, 4, etc., and, after having passed through the latter, are directed parallel to those issuing from the Fresnel rings $a, b, c, d, e$, etc.

The light rays issued from F and reflected by RR are concurrent in the plane of the figure and their meeting point is at F': virtual image of the source of light assumed to be punctiform.

Everything therefore takes place as if the supplementary dioptric rings 1, 2, 3, 4, 5, etc. were illuminated by a second source of light placed at F'.

If, for instance, the distance from the trace or path RR of the reflectors to the axis $yy'$ is equal to the focal distance OF of the entire series of Fresnel dioptric rings, and if the reflected rays IM and I'M' are respectively parallel to the rays FN and FN', consideration of the two similar triangles OFN and OF'M immediately shows that the focal distance OF' of the entire set of supplementary dioptric rings is triple the focal distance OF of the Fresnel dioptric rings and the total useful height MM' of the entire set is itself triple the total useful height of the Fresnel rings.

Consequently, the optical system according to the invention has for effect to considerably increase the useful height of the dioptric drums or the useful diameter of the stepped lenses employed up to this day, and to thus allow to obtain, for equal efficiency, a cheaper, lighter and less cumbersome apparatus.

Rotation of Fig. 1 about the axis $yy'$ generates a dioptric drum $TT'$ (Fig. 2) having a focal distance $OF$ and two cylindrical reflectors $R_2$, $R_3$.

In this rotation, all the light rays falling on the supplementary dioptric rings 1, 2, 3, 4, etc., form an arc of circle having a radius $FF'$, which is the geometrical location of focal points such as $F'$.

Rotation of Fig. 1 about the axis $XX'$ generates a stepped dioptric lens $LL'$ (Fig. 3), having a focal distance $OF$, and a plane annular reflector $R_1 R_1$.

In this rotation, all the light rays falling on the supplementary dioptric rings 1, 2, 3, 4, etc., meet at a single point $F'$.

In the device described in the foregoing, the dioptric rings all differ from each other by their section. The present invention also concerns the device described hereinafter by way of example, and which is a modification of the first device. In this example the supplementary dioptric rings are identical to the known Fresnel dioptric rings.

To the normal Fresnel dioptric rings (the sections of which are shown at $a$, $b$, $c$, $d$, $b'$, $c'$, $d'$, etc. (Fig. 4) and the common focus of which is at $F$ where the single source of light is placed) are juxtaposed a number of series of supplementary rings $a_1$, $b_1$, $c_1$, $d_1$, $e_1$, etc. having their common focus at $F'$,—$a_2$, $b_2$, $c_2$, $d_2$, $e_2$, etc., having their common focus at $F''$,—$a_3$, $b_3$, $c_3$, $d_3$, $e_3$, etc., having their common focus at $F'''$.

These series of supplementary rings are identical to one of the halves of the series $a\ b\ c\ d\ e\ b'\ c'\ d'\ e'$ assumed to be divided in two by the axis $xx'$. The respective focal distances $O'F'$-$O''F''O'''F'''$ are all equal to each other and equal to the distance $OF$.

The foci $FF'F''F'''$ are all on the same axis $yy'$.

Reflectors $R_1 R_2 R_3$, the generatrices of which are arcs of ellipses having respectively their foci at $F$ and $F'$, $F$ and $F''$, and $F$ and $F'''$, respectively produce at $F'$, $F''$, $F'''$ real images of the single source of light placed at $F$, and this owing to the property possessed by an arc of ellipsis to concentrate on the second focus all the rays issued from the first focus and which it reflects.

Everything takes place therefore as if another source of light was located at the focus of each series of supplementary rings.

If the distance $Ff$ (Fig. 4) is equal to the distance $OF$, if use is made of arcs of three different ellipses and if the rays $fF'O''$, $f'F''O'''$, $f''F'''O''''$ are parallel to $FO'$, examination of the figure shows (equality of the triangles $OFO'$, $O'F'O''$, etc.) that the total useful height $MM'$ of the entire structure is quadruple the total useful height of the normal Fresnel rings.

Rotation of Fig. 4 about the axis $yy'$ generates a dioptric drum $TT'$ (Fig. 5) and six toro-elliptical reflectors $R_1 R_2 R_3 R_4 R_5 R_6$.

Rotation of Fig. 4 about the axis $XX'$ generates a stepped dioptric lens $LL'$ (Fig. 6) and three elliptical reflectors $R_1 R_2 R_3$.

The reflectors can be made of blown, moulded or machined glass or of metal, or any other material.

The dioptric rings are usually made of moulded machined glass, but they can be made of moulded non-machined glass, or of any other material of good transparency and having an index of refraction different from that of air.

It is obvious that the examples described and illustrated are not given in a limitative sense, and that it is possible to modify, in any suitable manner, the number, shape, nature, arrangement and assemblage of the various elements without departing from the scope of the invention.

In particular, the optical surfaces used can be replaced by equivalent surfaces; for instance, the reflecting mirrors illustrated can be replaced by total or even partial reflection prisms if it is desired to collect a portion of the flux for an accessor purpose, etc. Likewise, the series of supplementary rings might for instance not be juxtaposed, so as to provide, if need be, dark zones between the illuminated zones, etc.

The applications of the invention are very numerous. The following will be cited by way of examples: fixed and rotating marine and aeronautical lights of all kinds, beacons, fixed or movable search-lights of large surface, all harbour lights, lenticular search-lights, shop window lights, theatre foot lights, luminous advertising columns, etc.

What I claim as my invention and desire to secure by Letters Patent is:

1. An optical system having multiple foci and a single source of light, the source of light coinciding with one of the foci and reflecting surfaces forming with the other foci images of said source.

2. An optical system as claimed in claim 1 including a Fresnel dioptric surface, the focus of which coincides with the light source, supplementary dioptric surfaces and reflecting surfaces forming with the foci of said supplementary dioptric surfaces images of the source.

3. An optical system as claimed in claim 1 including a Fresnel dioptric surface, the focus of which coincides with the light source, supplementary dioptric surfaces and reflecting surfaces forming with the foci of said supplementary dioptric surfaces images of the source, said reflecting surfaces being disposed on both sides of said source of light.

4. An optical system as claimed in claim 1 including a Fresnel lens the focus of which coincides with the source of light, supplementary dioptric rings, and a plane mirror forming with the focus of said supplementary dioptric rings an image of said source of light.

5. An optical system as claimed in claim 1, including a Fresnel dioptric surface the focus of which coincides with the source of light, supplementary dioptric surfaces, and a plane mirror in the form of a circular crown forming with the focus of the supplementary dioptric surfaces an image of said source of light.

6. An optical system as claimed in claim 1 including a Fresnel lens the focus of which coincides with the source of light, supplementary dioptric rings, and a plane mirror forming with the focus of said supplementary dioptric rings an image of said source of light, said dioptric surfaces forming a dioptric drum and said mirror being cylindrical.

7. An optical system comprising a dioptric system, a luminous source arranged to directly lighten said dioptric system, a supplementary dioptric system, analogous to the system which is directly lightened by said luminous source, at least one reflecting surface disposed on the other side of said source of light with reference to said dioptric systems, and arranged to produce from said source of light at least one image used as luminous focus for said supplementary dioptric system.

8. An optical system as claimed in claim 7 in which said reflecting surface has the form of a circular ring centered upon the optical axis of said dioptric systems.

9. An optical system as claimed in claim 7 in which said dioptric systems as well as said reflecting surface have a cylindrical form of revolution about a common axis.

10. An optical system as claimed in claim 7 in which said reflecting surface has an elliptical cross section.

11. An optical system comprising a dioptric system, a luminous source arranged to directly lighten said dioptric system, a supplementary dioptric system, analogous to the system which is directly lightened by said luminous source, said supplementary dioptric system having a plurality of optical foci, which are all situated on a common axis passing through the luminous source, a reflecting system adapted to produce, from said source of light, a plurality of images coinciding with said optical foci.

12. An optical system as claimed in claim 11 in which the reflecting surfaces of said reflecting system have the form of a set of circular rings of elliptical cross section, said rings being centered upon the common optical axis of said dioptric systems.

13. An optical system as claimed in claim 11 in which said dioptric systems have the form of a cylinder and the reflecting surfaces of said reflecting system have a toro-elliptical form, and are centered upon the axis of said cylinder.

ANTOINE ANDRÉ MAILLET.